United States Patent [19]

Hermans

[11] Patent Number: 5,080,164

[45] Date of Patent: Jan. 14, 1992

[54] PROCESS AND DEVICE FOR HEAT TREATMENT IN CONTINUOUS FLOW OF A PRODUCT MIXTURE CONSISTING OF A LIQUID CONTAINING SOLID PARTICULATES

[75] Inventor: Willem F. Hermans, Amstelveen, Netherlands

[73] Assignee: Stork Amsterdam B.V., Amsterdam, Netherlands

[21] Appl. No.: 275,347

[22] Filed: Nov. 23, 1988

[30] Foreign Application Priority Data

Nov. 24, 1987 [NL] Netherlands .......................... 8702819
Nov. 4, 1988 [NL] Netherlands .......................... 8802714

[51] Int. Cl.⁵ .......................... A23C 3/02; A23L 3/00; A23L 3/18; A23G 1/00
[52] U.S. Cl. .......................... 165/2; 165/66; 165/909; 165/920; 99/470; 99/483; 426/521; 426/522
[58] Field of Search ............ 165/2, 66, 920, 909; 99/470, 483; 426/521, 522

[56] References Cited

U.S. PATENT DOCUMENTS

| | | |
|---|---|---|
| 2,517,833 | 8/1950 | Bourland . |
| 2,537,053 | 1/1951 | Hemmeter . |
| 3,949,099 | 4/1976 | Kaufman .......................... 426/521 |
| 3,952,757 | 4/1976 | Huey .......................... 134/134 |
| 4,181,072 | 1/1980 | Hirahara .......................... 99/353 |
| 4,214,013 | 7/1980 | Hirahara .......................... 426/629 |
| 4,255,459 | 3/1981 | Glen .......................... 99/470 |
| 4,637,936 | 1/1987 | White et al. .......................... 426/521 |
| 4,667,590 | 5/1987 | Balaam et al. .......................... 99/470 |
| 4,796,523 | 1/1989 | Mette .......................... 99/470 |
| 4,802,825 | 2/1989 | Hermans .......................... 416/231 B |
| 4,830,865 | 5/1989 | McFarlane et al. .......................... 426/521 |
| 4,850,270 | 7/1989 | Bronnert .......................... 99/470 |
| 4,880,648 | 11/1989 | Stamer .......................... 426/521 |
| 4,929,152 | 5/1990 | Hermans .......................... 415/203 |
| 4,953,633 | 9/1990 | Hermans .......................... 165/109.1 |

FOREIGN PATENT DOCUMENTS

| | | |
|---|---|---|
| 2188408 | 1/1974 | France . |
| 2197532 | 3/1974 | France . |
| 7007638 | 12/1970 | Netherlands . |
| 7414167 | 5/1975 | Netherlands . |
| 604566 | 9/1978 | Switzerland . |
| 1313281 | 4/1973 | United Kingdom . |
| 1521003 | 8/1978 | United Kingdom .......................... 426/521 |

Primary Examiner—John Ford
Attorney, Agent, or Firm—Weintraub, DuRoss & Brady

[57] ABSTRACT

During a heat treatment in continuous flow of a product mixture consisting of a liquid containing solid particulates, the mixture is heated to a certain desired temperature in one or more heat exchange sections, held at this temperature in a heat-holding section for a certain time, and then cooled to the desired end temperature in one or more heat exchange sections. The residence time of the solid particulates in the heat-holding section is regulated separately and independently of the residence time of the liquid in the heat-holding section, while the solid particulates are constantly flowed round by the liquid. If there are solid particulates of various sizes in the liquid, the residence time of the various size fractions of solid particulates is regulated separately depending on the size of the solid particulates in a particular fraction. With this fraction-specific heat treatment it can be achieved that both the solid particulates of differing size and the liquid in the product mixture acquire a minimum required processing value, while at the same time it is prevented that one or more of the size fractions of solid particulates or the liquid is exposed to a high temperature for an unnecessarily long time, which can lead to deterioration of the quality of the product mixture. The device for carrying out the process comprises a heat-holding device with one or more retaining devices. Each retaining device is designed for retaining solid particulates of a certain size and larger during a certain time and allowing the smaller particulates and the liquid to pass.

17 Claims, 6 Drawing Sheets

PROCESS AND DEVICE FOR HEAT TREATMENT IN CONTINUOUS FLOW OF A PRODUCT MIXTURE CONSISTING OF A LIQUID CONTAINING SOLID PARTICULATES

BACKGROUND OF THE INVENTION

The present invention relates to a process for heat treatment in continuous flow of a product mixture consisting of a liquid containing solid particulates, in which the mixture is heated to a certain desired temperature in one or more heat exchange sections, is held at this temperature in a heat-holding section for a certain time, and is then cooled to the desired end temperature in one or more heat exchange sections.

The invention also relates to a device for carrying out the above process.

During the heat treatment of a product mixture consisting of a liquid containing solid particulates, for example a sterilization or pasteurization process for pumpable foodstuffs, it is generally required that each fraction of the mixture acquires at least a fixed minimum processing value. If it is ensured during the heat treatment that the fraction of the largest solid particulates acquires the minimum processing value, as a result of different heating-through times of the various fractions, the fractions of smaller solid particulates and the liquid acquires a considerably higher processing value than the minimum required processing value, which is found in a number of cases to have an adverse effect on the quality of the total product on completion of the heat treatment. For example, undesirable colour and flavour changes may have occured.

An example of such a heat treatment is the sterilization process which is carried out on a soup made of a liquid of low to medium viscosity containing solid vegetable and meat particulates. After the soup has been dispensed into cans and the cans have been hermetically sealed, the cans are then subjected with their contents to the heat treatment in a sterilizer. In particular if the cans are rotated during the sterilization process, the liquid is heated up in a short time and very soon reaches the temperature of the heating medium (steam or hot water at, say, 121° C.) in the sterilizer. The outside of the solid particulates also quickly follows the temperature of the liquid. However, the heat transfer to the thermal centre of the solid particulates can take place only through conduction. The temperature of the thermal centre consequently rises considerably more slowly, and it takes quite a long time for this thermal centre to attain the minimum required processing value. The larger the solid particulates, the longer the heat treatment has to last. In such a heat treatment the smaller solid particulates and in particular the liquid are given a much higher processing value than would in fact be necessary to achieve the desired effect, for example adequate microbiological inactivation.

The same phenomenon occurs if a pumpable carrier liquid containing larger and smaller solid particulates is conveyed in a continuous stream successively through a number of first heat exchange sections, in which at least the carrier liquid is heated to a desired temperature, a heat-holding section, and a number of second heat exchange sections which are connected thereto and in which the product is cooled to a desired end temperature. Between the heating and cooling sections the carrier liquid is held in the heat-holding section at the temperature level reached in the heating sections for so long that the temperature of the thermal centre of the solid particulates carried along develops in such a way that the minimum required processing value is attained also in the thermal centre of the solid particulates. The cooling of the carrier liquid may not be started until then. The cooling could possibly be started slightly earlier if the inertia of the heat transfer to the thermal centre of the solid particulates is anticipated, in the sense that the outside of a solid particulate may already be cooled, since the temperature still continues to rise in the thermal centre for a short time. An additional factor in the above-described heat treatment is that the conveyance of solid particulates in a carrier liquid depends greatly on the Reynolds number of the carrier liquid and the dimensioning of the types of heat exchanger chosen (for example plate-type, tubular or Votator heat exchangers). Moreover, it is difficult to forecast the conveyance of the solid particulates, so that establishing the heating and cooling curves of the thermal centre of the solid particulates and thus the processing value attained is extremely unreliable. In order to be able to carry out the heat treatment process safely, the necessary safety margins must be observed in the heat treatment.

SUMMARY OF THE INVENTION

It is the object of the present invention is to eliminate the above-mentioned disadvantages of treatment in continuous flow of a product mixture consisting of a liquid containing large and small solid particulates.

This object is achieved according to the invention in that the residence time of the solid particulates in the heat-holding section is regulated separately from the residence time of the liquid in the heat-holding section, while the solid particulates are constantly flowed round by the liquid.

This means, on the one hand, that the carrier liquid does not acquire a higher processing value than desired and, on the other hand, that the thermal centre of the solid particulates also acquires the required processing value.

If there are solid particulates of various sizes in the liquid, it is preferred that the residence time of the various size fractions of solid particulates is regulated separately depending on the size of the solid particulates in a particular fraction, in such a way that the thermal centre of the various solid particulates acquires more or less the same processing value. This process can be described by the term "fraction-specific heat treatment".

It is expedient if the residence time of a particular size fraction of solid particulates in the heat-holding section is increased as the dimensions of the solid particulates in this fraction are larger.

In a particular embodiment of the process according to the invention the liquid and each of the different size fractions of solid particulates contained in the liquid are subjected to a different heat treatment.

The device for carrying out the above-mentioned process, comprising one or more heat exchangers in which the mixture of liquid and solid particulates can be heated to a certain desired temperature, a heat-holding device in which the liquid and the solid particulates can be held at this temperature for a certain time, and one or more heat exchangers in which the mixture can be cooled to the desired end temperature, is according to the invention characterized in that the heat-holding device has retaining means with which the residence time of the solid particulates in the heat-holding device can be regulated separately and independently of the residence time of the liquid in the heat-holding device, while the solid particulates are constantly flowed round by the liquid.

The retaining means preferably comprise several retaining devices set up in succession for retaining solid particulates and containing retaining elements provided with passage apertures, the size of the passage apertures in the retaining elements of a particular retaining device being essentially the same, while the size of the passage apertures in the retaining elements of different retaining devices is different for each of the retaining devices, it being expedient for the size of the passage apertures in the retaining elements of the successive retaining devices to decrease in the direction from the heat exchangers for heating the product mixture to the heat exchangers for cooling the product mixture.

This makes it possible to retain the fraction of solid particulates with the greatest dimensions already from the first retaining element, while the smaller solid particulates can flow with the liquid through the passage apertures in the first retaining element directly to the next retaining element, from which point the next size fraction of solid particulates can be retained.

In order to permit optimum heat treatment, the time during which the various retaining devices can retain the solid particulates can be set separately for each of the retaining devices.

The invention will be explained below by means of the following description of an example of an embodiment with reference to the drawings.

DETAILED DESCRIPTION OF THE PREFERRED EMBODIMENT

Figure 1:
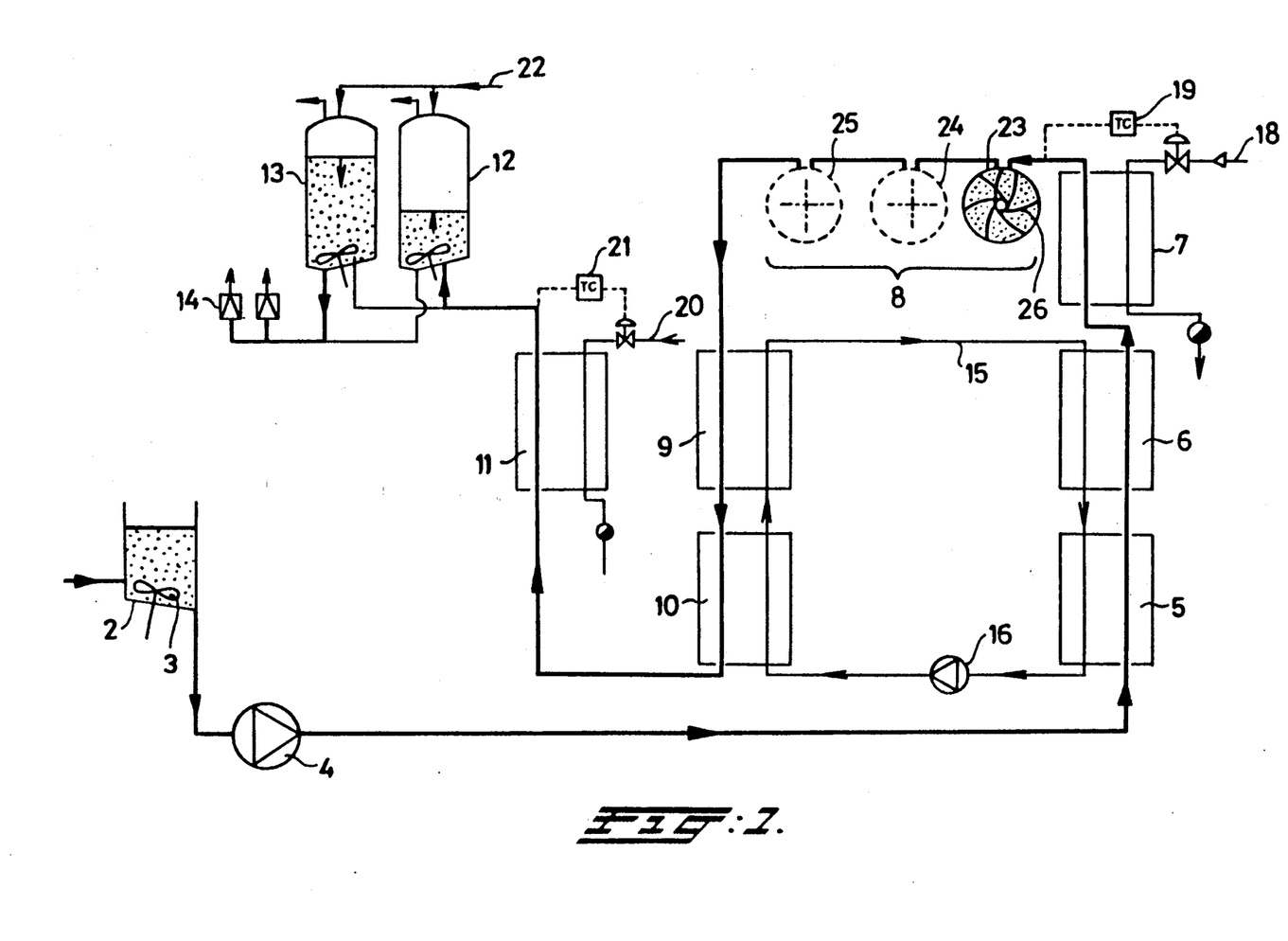
FIG. 1 shows a simplified schematic diagram of a particular embodiment of a device according to the invention.

FIG. 1 shows a simplified diagram of a device for heat treatment in continuous flow of a product mixture consisting of a liquid containing solid particulates. The product mixture to be treated is fed in via a product feed, and an interim storage vessel 2 with stirring elements 3 to a pump 4 with positive displacement. Said pump 4 pumps the product mixture successively through two regenerative heat exchangers 5 and 6, a heating unit 7, a heat-holding device 8, two regenerative heat exchangers 9 and 10, a cooling unit 11, and a counterpressure device 12, 13 to a product discharge 14, which leads to aseptic dispensing devices which are not shown here. In the regenerative heat exchangers 5 and 6 the product mixture to be treated is preheated by means of heat coming from the already treated product mixture. This heat is extracted from the already treated product mixture in the regenerative heat exchangers 9 and 10 and pumped via the intermediate circuit 15 by pump 16 to the heat exchangers 5 and 6. In the heating unit 7 the product mixture to be treated is indirectly heated to the desired temperature by means of steam or hot water, which is fed in at 18. This temperature is regulated by means of a temperature regulator 19.

In the heat-holding device to be described in greater detail below the liquid containing the solid particulates is then held for some time at the desired temperature in order to let the liquid and the solid particulates contained therein attain the required processing value.

In the regenerative heat exchangers 9 and 10 the treated product mixture is precooled and in the cooler 11 is cooled to the required end temperature by means of water which is fed in at 20. The end temperature is regulated by means of a temperature regulator 21.

The counterpressure device comprises two tanks 12 and 13. The cooled product mixture is fed to one of the two tanks, and the pressure in the tank is held at such a value by means of sterile air fed in at 22 that in the preceding section of travel vapour formation through boiling cannot occur anywhere. When the particular tank is full the product flow is conducted to the other tank, and the first tank is brought to the supply pressure required for the dispensing device, so that the product mixture present in the tank can be conveyed via the product discharge 14 to an aseptic dispensing device.

For the sake of simplicity, various valves in the sterile air lines and in the conveyance pipes are not shown.

Apart from the heat-holding device 8, the heat treatment device described above is known.

The heat-holding device 8 has retaining means by means of which the residence time of the solid particulates in the heat-holding device 8 can be regulated separately and independently of the residence time of the liquid in the heat-holding device 8, while the solid particulates are constantly flowed round by the liquid. The retaining means comprise one retaining device or several, in this example three, retaining devices 23, 24, 25 set up in succession for retaining solid particulates, and containing retaining elements 26 provided with passage apertures. The passage apertures in the retaining elements of a particular retaining device are essentially the same size. The size of the passage apertures in the retaining elements of different retaining devices 23, 24, 25 differs for each of the retaining devices. In the example of an embodiment shown here the passage apertures are largest in the retaining elements 26 in the retaining device 23 and smallest in the retaining device 25.

In the first retaining device 23 only the fraction of the largest solid particulates (for example, with a size greater than 20 mm) is retained for a time which can be set for this device, while the carrier liquid together with the smaller solid particulates flows round this fraction of the largest solid particulates and flows unimpeded through the first retaining device 23.

In the second retaining device 24 both the fraction of the largest solid particulates, which after the retention period in the first retaining device 23 is flowing again with the carrier liquid, and a subsequent fraction of medium-sized solid particulates (for example, with a size greater than 10 mm and smaller than or equal to 20 mm) are retained for a period of time which can be set for this device, while the carrier liquid together with the even smaller solid particulates flows round the retained solid particulates and flows unimpeded through this retaining device 24.

In the third retaining device 25 both the fraction which has already been retained in the first 23 and second 24 retaining device and the fraction which was retained only in the second retaining device 24 together with the fraction of small solid particulates (for example, with a size greater than 3 mm and smaller than or equal to 10 mm) are retained for a period of time which can be set for this retaining device, while the carrier liquid together with the smallest solid particulates (with a size smaller than or equal to 3 mm) flows round the retained solid particulates and flows unimpeded through the retaining device 25.

In this example, at the temperature level of the unimpeded flowing carrier liquid, of which the residence time in the heat holding device 8 is, for example, $t_{v1}$, the residence time of the various size fractions in the heat-holding device 8 is determined by the residence time $\Delta t_{23}$, $\Delta t_{24}$, and $\Delta t_{25}$ to be set for each retaining device 23, 24, 25.

If the residence time of the liquid in each of the retaining devices 23, 24, 25 is set at $\delta t$, the following scheme (in which d is the size of the solid particulates) is obtained for the residence times of the liquid and the solid particulates in the heat-holding device 8:

| | |
|---|---|
| the residence time of liquid and smallest particulates (e.g. $d \leq 3$ mm): | $t_{v1}$ |
| residence time of small particulates (e.g. 3 mm $< d \leq 10$ mm): | $t_{v1} - \delta t + \Delta t_{25}$ |
| residence time of medium-sized particulates (e.g. 10 mm $< d \leq 20$ mm): | $t_{v1} - 2\delta t + \Delta t_{25} + \Delta t_{24}$ |
| residence time of largest particulates (e.g. $d > 20$ mm): | $t_{v1} - 3\delta t + \Delta t_{25} + \Delta t_{24} + \Delta t_{23}$ |

It is clear that by proper selection of the number of retaining devices 23, 24, 25 in which solid particulates with dimensions which are greater than a particular value are retained and of the time the solid particulates are retained in the retaining devices 23, 24, 25, it is possible to achieve a heat treatment adapted to the product, each fraction of solid particulates and the carrier liquid undergoing the optimum heat treatment.

Figure 2:
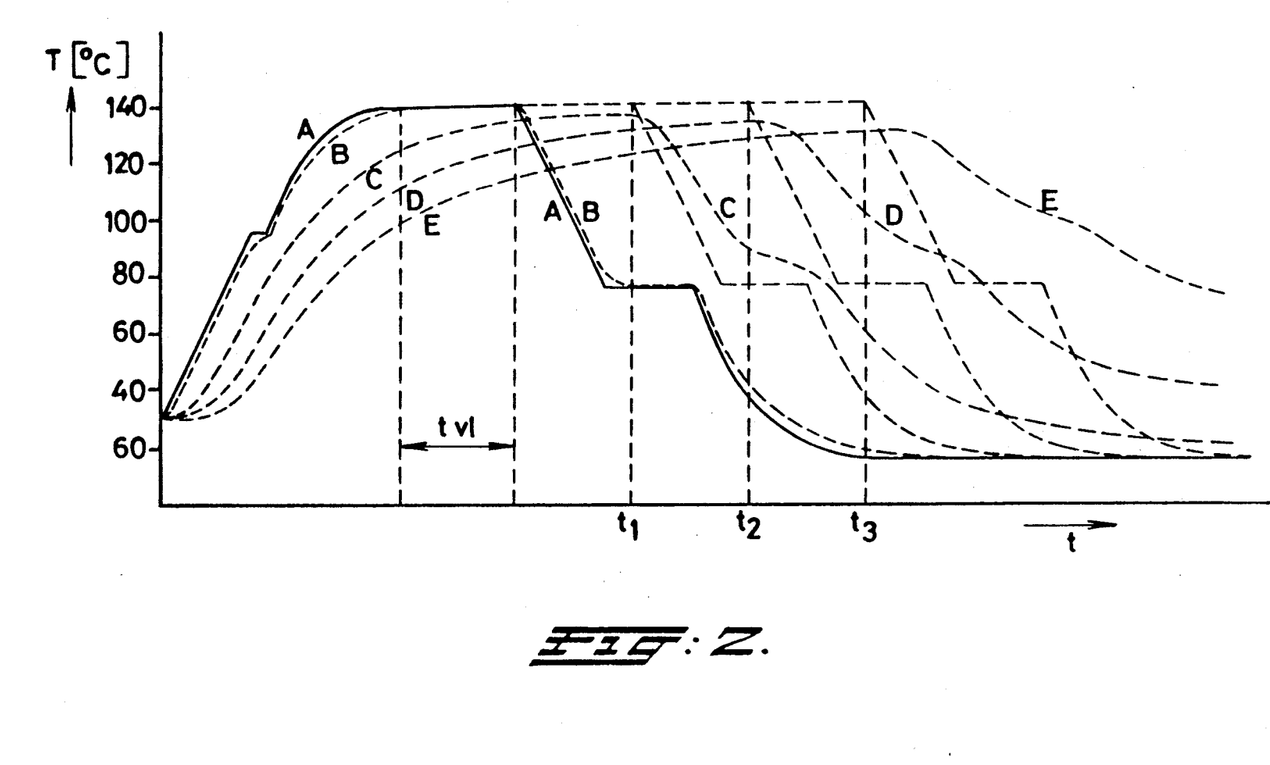
FIG. 2 shows the curve of the temperature of the liquid and of the thermal centre of certain solid particulates in various, size fractions of solid particulates during the heat treatment of a product mixture in a device according to the invention.

FIG. 2 shows the temperature curve of the carrier liquid and the temperature curve in the thermal centre of solid particulates of differing size during the heat treatment process.

The line A represents the temperature curve of the carrier liquid in the regenerative heat exchangers 5 and 6, the heating unit 7, the heat-holding device 8, the regenerative heat exchangers 9 and 10, and the cooling unit 11. The line B represents the temperature curve of the thermal centre of the solid particulates within the fraction of the smallest solid particulates which together with the liquid flows unimpeded through all three retaining devices 23, 24, 25. The line C represents the temperature curve of the thermal centre of the largest solid particulate within the fraction of small solid particulates which together with the carrier liquid and the fraction of the smallest solid particulates flows unimpeded through the first 23 and second 24 retaining devices. The line D represents the temperature curve of the thermal centre of the largest solid particulate within the fraction of medium-sized solid particulates which together with the carrier liquid, the fraction of the small solid particulates and the fraction of the smallest solid particulates flows unimpeded through only the first retaining device 23. Finally, the line E represents the temperature curve in the thermal centre of the largest solid particulate within the fraction of the largest solid particulates which is retained by each of the successive retaining devices 23, 24, 25 for a period of time which can be set for each retaining device, while the carrier liquid together with the other fractions of solid particulates flows unimpeded through this first device, and the solid particulates retained by the retaining device 23 are flowed round freely.

At time $t = t_1$, $t_2$ and $t_3$ the one or more retained fractions in the retaining devices 23, 24, 25 flowed through in succession are released again and carried along by the flowing carrier liquid. The times $t_1$, $t_2$ and $t_3$ are set here by means of the retention time settable per retaining device, in such a way that each of the fractions acquires a processing value which is no higher than the desired minimum required processing value.

With the system described above, it is achieved that within each size fraction of solid particulates to be selected and within the carrier liquid fraction with the freely flowing fraction of smallest solid particulates the heat treatment for each of these fractions can be selected in such a way that none of these fractions need undergo a heavier heat treatment than the minimum required. An optimum process is thereby obtained, in which adverse effects such as colour and flavour changes can be kept to a minimum. A further achievement with this system is that the residence times of the various size fractions of solid particulates can be calculated for a particular desired temperature level of the carrier liquid by means of dimensioning of the successive retaining devices, and the uncertainty with regard to the residence time spread of solid particulates in a free-flowing carrier liquid can be eliminated, at least for the design and calculation of a thermal process.

Figure 2A:
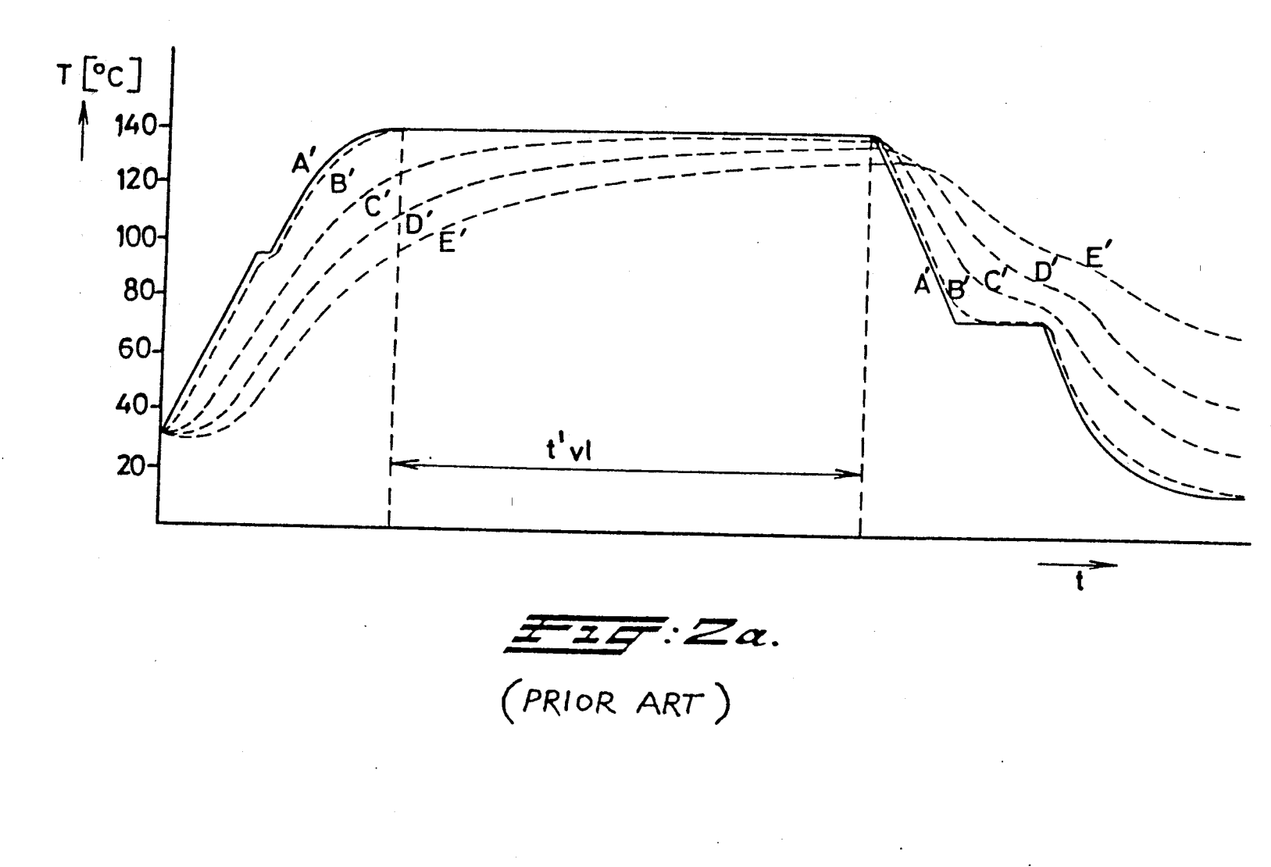
FIG. 2a shows the curve of the temperature of the liquid and of the thermal centre of certain solid particulates in various size fractions of solid particulates during the heat treatment of a product mixture in a device according to the state of the art with a common heat-holding device without retaining devices.

For comparision, FIG. 2a shows (analogous to FIG. 2) the temperature curve of the carrier liquid and the temperature curve of the thermal centre of solid particulates of differing size during the heat treatment process in a device analogous to the device of FIG. 1, but without retaining devices 23, 24, 25. Instead of the heat-holding device of used in the device of FIG. 1a common heat-holding device is used (for example, in the form of a long duct). Again, the lines A' to E' represent the temperature curve of the liquid and the thermal centre of the solid particulates of the same size as in case of FIG. 2. The residence time in the heat-holding device is the same for all solid particulates and equal to the residence time the liquid $t'_{v1}$. The temperature curve of the largest solid particulates is the same in FIG. 2a (line E') and in FIG. 2 (line E). The temperature curve of the smaller solid particulates is different in FIG. 2a and in FIG. 2. When no retaining devices are used (FIG. 2a) the residence time of the solid particulates and the liquid is determined by the largest solid particulates. The smaller solid particulates and the liquid are thereby kept at a high temperature for an unnecessarily long time, which results in a deterioration of their quality, as will be explained in greater detail below.

The retaining devices 23, 24, 25 can be designed in different ways. It is important here that a size fraction of solid particulates which is retained in one or more of the successive retaining devices during a settable period of time is not separated in the meantime from the liquid flow and during the residence time within the successive retaining devices is flowed around freely by the carrier liquid containing the fraction of solid particulates smaller than those which are being retained temporarily in the relevant retaining device, so that in this way sufficient thermal energy is released from the freely flowing carrier liquid to the particular fraction being retained.

Figure 3:
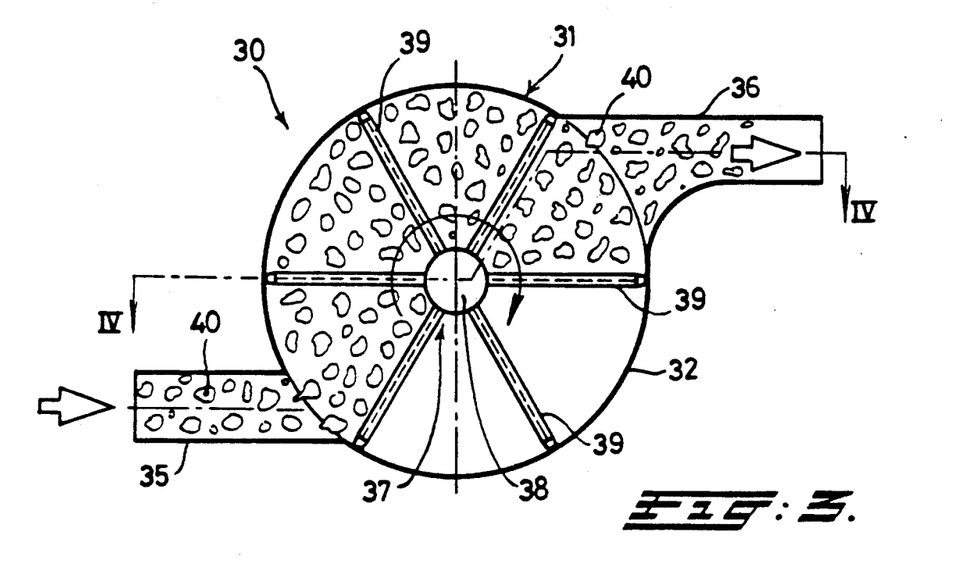
FIG. 3 shows schematically a particular embodiment of a retaining device used, in a cross section at right angles to the axis of rotation of the retaining element.
Figure 4:
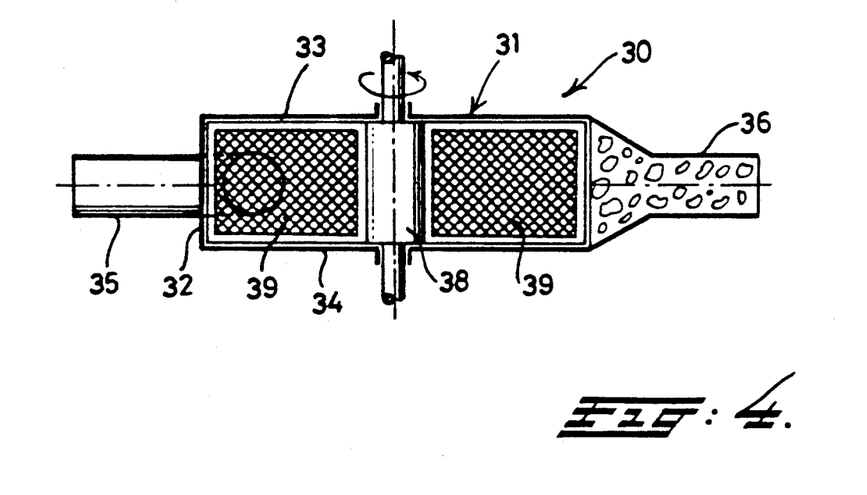
FIG. 4 is a cross section of the retaining device of FIG. 3, along the line IV—IV.

The embodiment of a retaining device shown in FIGS. 3 and 4 is indicated in its entirety by 30 and comprises an essentially closed cylindrical tank 31 having a peripheral edge 32 and two end walls 33 and 34. A supply line 35 and a discharge line 36 are connected to the peripheral edge.

Provision is made inside the tank 31 for a retaining element in the form of a rotary blade wheel 37, comprising a shaft 38 with a number of blades 39, in this case six, fitted thereon. The axis of rotation of the blade wheel coincides with the axis of the cylindrical tank 31. The free peripheral edge of each of the blades 39 is situated near the inside of the cylindrical peripheral edge 32 and the two end walls 33 and 34 of the tank 31. The blades 39 are permeable, and for this purpose can have a sieve structure, as shown in FIG. 3. It is, however, possible to provide the blades 39 with slits.

The blade wheel 38 can be driven with an adjustable speed of rotation by a shaft projecting through one or both end walls 33 and 34 of the tank 31. The drive unit is not shown further here.

The product mixture, which has to be kept at a certain temperature for a certain time, can be fed in through the supply line 35 and discharged through the discharge line 36. The carrier liquid can flow freely in all directions through the tank directly from the supply line 35 through the apertures in the blades to the discharge line 36. The liquid will choose the route of least resistance here.

The solid particulates 40 in the liquid will, on the other hand, be retained by the rotary blades 39 and are thereby prevented from following the shortest route from the supply line 35 to the discharge line 36. The solid particulates are collected between the blades 39 of the driven blade wheel and carried along in the direction of rotation of the blade wheel until they arrive at the discharge line 36. There the solid particulates 40 leave the space between the blades 39, because they are carried along by the carrier liquid flowing through the tank 31, and arrive in the discharge line 36. The residence time of the solid particulates 40 in the tank 31 can be determined independently of the residence time of the liquid in the tank by setting the speed of rotation of the blade wheel 37. The residence time of the solid particulates 40 in the tank can be set in such a way that the solid particulates 40 are sufficiently heated through.

Figure 5:
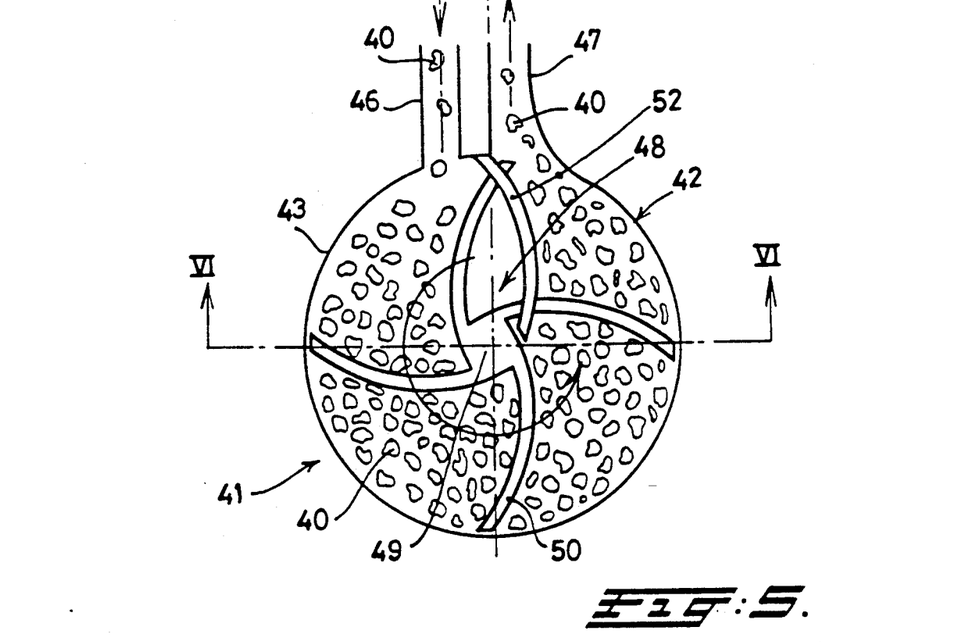
FIG. 5 shows schematically another embodiment of a retaining device in a cross section according to FIG. 3.
Figure 6:
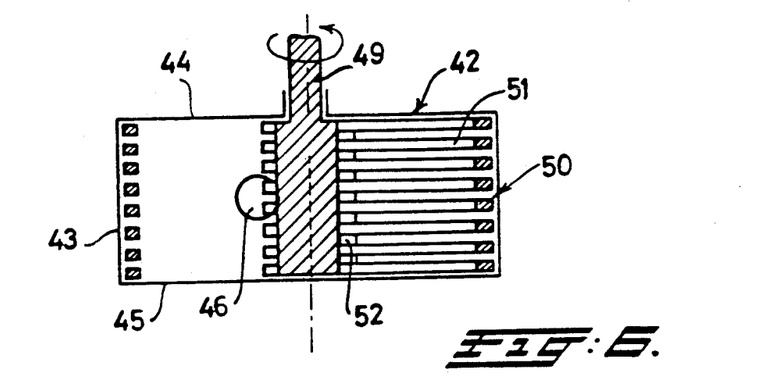
FIG. 6 is a cross section of the device of FIG. 5 along the line IV—IV.
Figure 7:
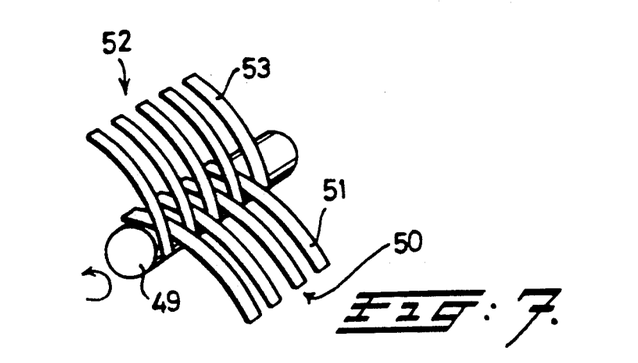
FIG. 7 shows schematically and in perspective a retaining element which is disposed on a shaft and comprises pins, and which has a gripping element engaging between them for the removal of the solid particulates.

FIGS. 5 through 7 show another embodiment of a retaining device which is indicated in its entirety by 41. The device also has an essentially cylindrical tank 42 with a cylindrical peripheral wall 43 and end walls 44 and 45. A supply line 46 and a discharge line 47 are also connected to the tank, the discharge line 47 being situated slightly differently from that in the embodiment in FIGS. 3 and 4. In this embodiment also there is a blade wheel 48 comprising a number of blades 50 (in this case four blades) disposed on a shaft 49.

Each blade 50 comprises a number of pins 51 which are spaced apart in the direction of the shaft 49 and extend outwards at right angles from the shaft 49, the ends of said pins being situated near the inside of the cylindrical wall 43 of the tank 42. In the embodiment shown the pins 51 are curved. It is, however, possible to make the pins straight.

The retaining device according to FIGS. 5 and 6 works in essentially the same way as that of FIGS. 3 and 4.

For removal of the solid particulates 40 from the blades 50, the tank 42 contains near the discharge line 47 an element 52 which comprises a series of pins 53 which are disposed next to each other and at a distance from each other in the lengthwise direction of the tank, and which extend from the cylindrical wall 43 of the tank 42 in the direction of the shaft 49 and engage between the pins 51 of the blades 50. This ensures that no solid particulates are left on the blades, which could otherwise be conveyed a second time through the tank, thereby causing the residence time of said solid particulates in the heat-holding device to exceed the maximum residence time. FIG. 7 shows schematically the shaft 49 having disposed thereon a blade 50 consisting of pins 51, and also the element 52 consisting of the pins 53. Solid particulates 40 which have become lodged between the pins 51 are, as it were, pushed by the pins 53 in the lengthwise direction of the pins 51 out of the slits present between the pins 51.

FIGS. 8 to 10 give an idea of the results of a heat treatment of a product mixture consisting of a liquid containing solid particulates, carried out in:

a plant according to the state of the art with a heat-holding device without retaining devices (FIG. 8), a plant according to the invention with a heat-holding device with three retaining devices or a three-stage retaining device (FIG. 9), and a plant according to the invention with a great number of retaining devices or a multiple-stage (more than three) retaining device (FIG. 10).

Figures 8A, 8B:
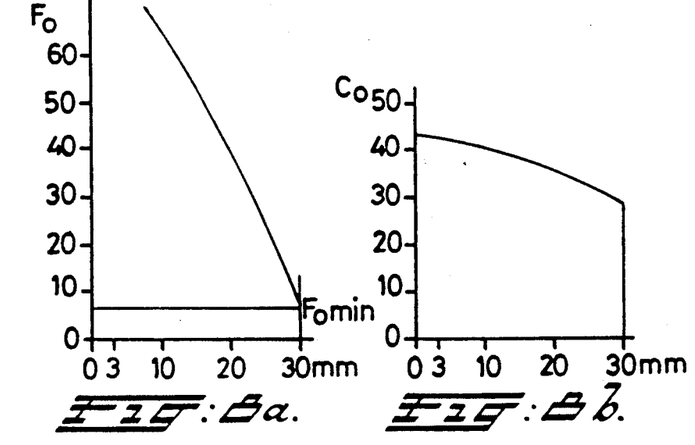
FIGS. 8 to 10 show two processing values for solid particulates of different size which are attained during the heat treatment of a product mixture in a plant without retaining devices (FIG. 8), in a plant with three retaining devices or a three-stage retaining device (FIG. 9) and a plant with a great number retaining devices or a multiple-stage (more than three) retaining device (FIG. 10) respectively.
Figures 9A, 9B:
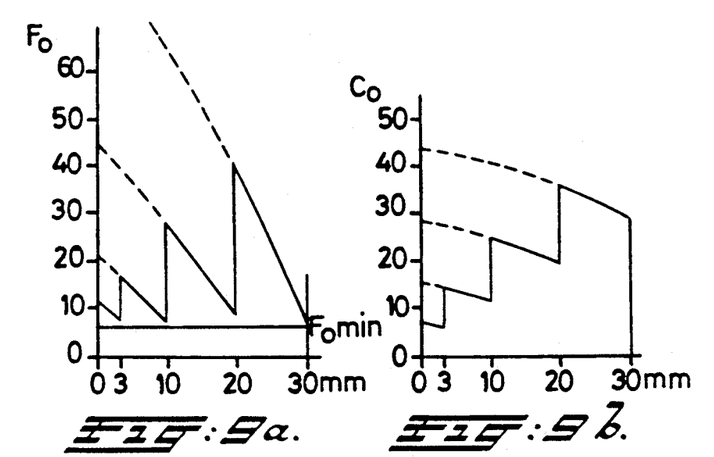
Figures 10A, 10B:
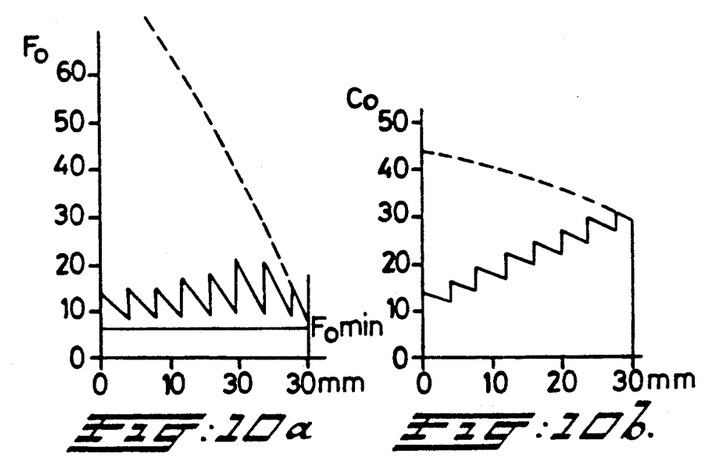

FIGS. 8a, 9a and 10a show the processing value $F_o$ in the thermal centre of the solid particulates as a function of the thermal size of the solid particulates, as well as the processing value $F_o$ in the liquid (size 0).

$F_o$ represents the lethality and is defined as:

$$F_o = \int_0^t 10^{\frac{T-121.1}{10}} \cdot dt,$$

wherein t is the time and T the temperature of the thermal centre of the solid particulate or the temperature of the liquid.

$F_o$ is a measure for the biological inactivation of the thermal centre of the solid particulates and of the liquid.

FIGS. 8b, 9b and 10b show the processing value $C_o$ of the solid particulates as a function of the thermal size of the solid particulates, as well as the processing value $C_o$ of the liquid.

$C_o$ represents the cooking value and is defined as:

$$C_o = \int_0^t 10^{\frac{T-100.0}{33}} \cdot dt.$$

wherein t is the time and T the temperature integrated over the whole solid particulate or the temperature of the liquid.

$C_o$ is a measure of the thermal degradation of the solid particulates and of the liquid.

FIGS. 8 to 10 are valid for the heat treatment of a product mixture in which the largest solid particulates have a thermal size of 30 mm.

FIG. 8a,b shows which $F_o$- and $C_o$-values are attained with a heat treatment in a device according to the state of the art with a heat-holding device without retaining devices. The temperature curve of the liquid and the thermal centre of the solid particulates during such a heat treatment is shown in FIG. 2a.

FIG. 8a shows that, as a result of the long residence time of the whole product mixture in the heat-holding device, said residence time being necessary to attain the minimum $F_o$-value ($F_o$ min) in the thermal centre of the largest solid particulates, the thermal centre of the smaller solid particulates and in particular the liquid attains a very high $F_o$-value. It is however more important that also the $C_o$-value, which is a measure for the thermal degradation, is very high for the smaller solid particulates and for the liquid, which is disadvantageous for their quality.

FIGS. 9a,b shows which $F_o$- and $C_o$-values are attained with a heat treatment in a device according to the invention, in particular a device according to FIG. 1 with a heat-holding device 8 with three retaining devices 23, 24, 25 or a three-stage retaining device. The temperature curve of the liquid and the thermal centre of the solid particulates during this heat treatment is shown in FIG. 2. The retaining devices are set such that during the heat treatment the thermal centre of the largest solid particulates in each size fraction attains the minimum $F_o$-value.

FIG. 9a,b shows that the $F_o$- and $C_o$-values for the solid particulates the thermal size of which lies between 20 and 30 mm are equal to those in FIG. 8a,b. However, the $F_o$- and $C_o$-values for the smaller solid with a thermal size smaller than 20 mm and the liquid are considerably lower than in FIG. 8a,b. Particularly the lower $C_o$-value for the smaller solid particulates and the liquid has a favourable influence on the quality of the product mixture.

Finally, FIG. 10a,b shows which $F_o$- and $C_o$-values are attained if instead of three retaining devices, as is shown in FIG. 1, or a three-stage retaining device, a great number (in this case seven) of retaining devices or a multi-stage (seven-stage) retaining device is used. The $F_o$-value in the thermal centre of the solid particulates lies within rather narrow limits just above the minimum $F_o$-value (FIG. 10a) for all solid particulates. The $C_o$-value decreases stepwise from the $C_o$-value for the largest solid particulates to the $C_o$-value for the smallest solid particulates and the liquid (FIG. 10b).

By using a retaining device with passage apertures for the solid particulates which decrease continuously from the product feed to the product discharge, a constant or almost constant $F_o$-value could be attained for the solid particulates, while the $C_o$-value decreases uniformly from the $C_o$-value for the greatest solid particulates to the $C_o$-value for the smallest solid particulates and the liquid.

What is claimed is:

1. A process for heat treatment in continuous flow of a product mixture consisting of a liquid containing solid particulates, comprising the steps of:
    heating the mixture to a certain desired temperature in one or more heat exchange sections;
    holding the mixture at this temperature in a heat-holding section for a certain time, the heat-holding section comprising means for controlling residence time of the solid particulates independently of liquid residence time, the residence time of the solid particulates in the heat-holding section having a longer duration than the liquid residence time and being regulated by the control means separately and independently of the residence time of the liquid in the heat-holding section, the liquid being allowed to flow substantially unimpeded through the heat-holding section without recirculation thereof while the solid particulates are constantly flowed round by the liquid; and then
    cooling the mixture to the desired temperature in one or more heat exchange sections.

2. A process for heat treatment in continuous flow of a product mixture consisting of a liquid containing solid particulates, comprising the steps of heating the mixture to a certain desired temperature in one or more heat exchange sections, holding the mixture at this temperature in a heat-holding section for a certain time, the residence time of the solid particulates in the heat-holding section being regulated separately and independently of the residence time of the liquid in the heat-holding section, while the solid particulates are constantly flowed round by the liquid, and then cooling the mixture to the desired end temperature in one or more heat exchange sections, wherein the liquid contains solid particulates of various sizes which can be divided in a number of size fractions and the residence time of the different size fractions of solid particulates is regulated separately depending on the size of the solid particulates in a particular fraction.

3. The process of claim 2, wherein the residence time of a particular size fraction of solid particulates in the heat-holding section is increased as the dimensions of the solid particulates in this fraction are larger.

4. The process of claim 2, wherein the liquid and each of the different size fractions of solid particulates contained in the liquid are subjected to a different heat treatment.

5. A device for heat treatment in continuous flow of a product mixture consisting of a liquid containing solid particulates, comprising one or more heat exchangers in which the mixture of liquid and solid particulates can be heated to a certain desired temperature, a heat-holding device in which the liquid and the solid particulates can be held at this temperature for a certain time, the heat-holding device having retaining means comprising a movable retaining device having passage apertures formed therethrough to allow substantially unimpeded liquid flow therethrough without recirculation thereof, with which the residence time of solid particulates which are larger than the passage aperture in the heat-holding device can be regulated separately and independently of, and for a duration which is longer than, the residence time of the liquid in the heat-holding device, while the solid particulates are constantly flowed round by the liquid; and one or more heat exchangers in which the mixture can be cooled to the desired end temperature.

6. A device for heat treatment in continuous flow of a product mixture consisting of a liquid containing solid particulates, comprising one or more heat exchangers in which the mixture of liquid and solid particulates can be heated to a certain desired temperature, a heat-holding device in which the liquid and the solid particulates can be held at this temperature for a certain time, the heat-holding device having retaining means with which the residence time of solid particulates in the heat-holding device can be regulated separately and independently of the residence time of the liquid in the heat-holding device, while the solid particulates are constantly flowed round by the liquid; and one or more heat exchangers in which the mixture can be cooled to the desired end temperature; wherein the retaining means comprise several retaining devices set up in succession for retaining solid particulates, each retaining device containing retaining element provided with passage apertures, the size of the passage apertures in the retaining elements of a particular retaining device being essentially the same, while the size of the passage apertures in the retaining elements of different retaining devices is different for each retaining device.

7. The device of claim 6, wherein the size of the passage apertures in the retaining devices elements of the successive retaining devices decreases in the direction from the heat exchangers for heating the product mixture to the heat exchangers for cooling the product mixture.

8. The device of claim 6 or 7, comprising means for setting the time during which a retaining devices can retain the solid particulates separately for each retaining device.

9. The device of claim 6, wherein each of the retaining devices at least comprises a tank in which the product mixture stays for some time, and to which a supply line and discharge line for the product mixture are connected, and a retaining element fitted in the tank and acting selectively on a fraction of solid particulates above a certain size by means of which the speed of conveyance and consequently the residence time of these solid particulates in the tank can be regulated.

10. The device of claim 9, wherein the tank is essentially cylindrical and the retaining element is a retaining element which rotates at variable speed, and the axis of rotation of which coinciding with the axis of the cylindrical tank, and which is provided with at least one retaining part permeable to liquid.

11. The device of claim 10, wherein each retaining part has a sieve structure.

12. The device of claim 10, wherein each retaining part is provided with slits.

13. The device of claim 10, wherein each retaining part permeable to liquid is situated in a plane extending outwards from the shaft of the retaining element and parallel to said shaft and the free peripheral edge of each retaining part is situated near the inside of the cylindrical peripheral wall and the end walls of the tank.

14. The device of claim 13, wherein the plane in which each retaining part is situated is a flat plane.

15. The device of claim 13, wherein the plane in which each retaining part is situated is a curved plane.

16. The device of claim 13, wherein each retaining part comprises a number of pins which are spaced apart in the direction of the shaft of the retaining element and extend outwards at right angles from said shaft, the ends of said pins being situated near the inside of the cylindrical wall of the tank.

17. The device of claim 16, wherein the tank contains near the discharge line for the productmixture a removing part for removing the solid particulates from the retaining part, said removing part comprising a series of pins which are disposed next to each other and at a distance from each other in the lengthwise direction of the tank, and which extend from the cylindrical wall of the tank in the direction of the shaft of the retaining element and engage between the pins of the retaining part.

* * * * *